United States Patent
Yang

(10) Patent No.: US 7,636,085 B2
(45) Date of Patent: Dec. 22, 2009

(54) FLEXIBLE DISPLAY UNIT MOBILE TERMINAL HAVING THE SAME

(75) Inventor: Joo Young Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 418 days.

(21) Appl. No.: 11/726,317

(22) Filed: Mar. 21, 2007

(65) Prior Publication Data

US 2008/0086925 A1    Apr. 17, 2008

(30) Foreign Application Priority Data

Oct. 12, 2006    (KR)    ...................... 10-2006-0099355

(51) Int. Cl.
*G09G 5/00*    (2006.01)
(52) U.S. Cl. .......................... 345/204; 345/30; 345/107
(58) Field of Classification Search .................... 345/30, 345/55, 76, 87, 105–107, 204, 905; 361/679.01, 361/679.02, 679.15, 679.26–679.29, 679.09; 368/88

See application file for complete search history.

(56) References Cited

U.S. PATENT DOCUMENTS

| | | | |
|---|---|---|---|
| 6,229,588 B1 | 5/2001 | Abileah et al. | ............... 349/120 |
| 6,762,929 B2 * | 7/2004 | Sawyer | .................. 361/679.05 |
| 6,771,232 B2 * | 8/2004 | Fujieda et al. | ................. 345/30 |
| 7,158,111 B1 * | 1/2007 | Jackson et al. | ............... 345/107 |
| 7,463,238 B2 * | 12/2008 | Funkhouser et al. | ........ 345/107 |
| 2006/0166713 A1 | 7/2006 | Yeh et al. | |

FOREIGN PATENT DOCUMENTS

| | | |
|---|---|---|
| JP | 2003-043955 | 2/2003 |
| KR | 100189241 | 1/1999 |
| KR | 1020030078783 | 10/2003 |
| KR | 1020050088719 | 9/2005 |
| KR | 100625786 | 9/2006 |
| WO | WO 2003/050963 | 6/2003 |
| WO | WO2004/047059 | 6/2004 |

* cited by examiner

*Primary Examiner*—Jimmy H Nguyen
(74) *Attorney, Agent, or Firm*—The Farrell Law Firm, LLP

(57) ABSTRACT

A flexible display unit and a mobile terminal having the same are disclosed. The flexible display unit includes a flexible display film, insulated flexible display unit edges formed at two opposite edges of the display film, and a plurality of electromagnets formed in the display unit edges at predetermined intervals. The two opposite edges of the flexible film are straightened by magnetic forces when the display film is unrolled to the outside of a main body of the mobile terminal. Accordingly, a problem of the flexible display unit not being flat or being distorted may be solved. Additionally, the flexible display unit of the present invention is smoothly rolled into the main body in the same manner as in a conventional flexible display unit, because the flexibility of the flexible display unit of the present invention is recovered by removing the magnetic forces when rolling the flexible display unit into the main body.

11 Claims, 2 Drawing Sheets

FLEXIBLE DISPLAY UNIT MOBILE TERMINAL HAVING THE SAME

PRIORITY

This application claims priority to an application entitled "FLEXIBLE DISPLAY UNIT AND MOBILE TERMINAL HAVING THE SAME" filed in the Korean Intellectual Property Office on Oct. 12, 2006 and assigned Serial No. 2006-99355, the contents of which are incorporated herein by reference.

BACKGROUND OF THE INVENTION

1. Field of the Invention

The present invention relates to a mobile terminal, and more particularly, to a mobile terminal having a flexible display unit that is stored in a main body by rolling and used by unrolling to the outside of the main body whenever required.

2. Description of the Prior Art

The sizes of mobile terminals, such as a mobile communication terminal, Personal Digital Assistant (PDA), Portable Multimedia Player (PMP), and electronic scheduler, are becoming smaller for better portability. However, mobile terminal users prefer a larger and wider display screen to receive various kinds of information, such as character information, moving pictures, still images, MP3 files, and games.

However, there is a limitation to altering the display screen, because reducing the size of the mobile terminal inevitably results in reducing the size of the display screen.

To solve the above limitation, mobile terminals having a flexible display unit have been introduced recently. For example, Polymer Vision, a subsidiary company of Philips, exhibited 'Readius' at IFA (Internationale Funkausstellung) in 2005. The Readius is a flexible display unit having a 5-inch active matrix screen, and is rolled into a tubular main body with a radius less than 7.5 mm when the active matrix screen is not in use. The flexible display unit uses a thin plastic display panel instead of a glass display panel.

However, the flexible display unit when unrolled from the main body has poor flatness compared to a rigid display unit using a glass panel. Additionally, because the flexible display unit is rolled and stored in the main body, the flexible display unit may have a problem of being rolled back and could be distorted by a restitutive force.

SUMMARY OF THE INVENTION

The present invention has been made in view of the above problems, and an object of the present invention is to provide a flexible display unit maintaining a straightened state when being unrolled from a main body and being smoothly rolled back into the main body.

In order to achieve the above object and other objects, a flexible display unit of a mobile terminal according to an exemplary embodiment of the present invention includes a flexible display film having a front surface for displaying an image and a rear surface apposite to the front surface; insulated flexible display unit edges formed at opposite edges of the display film in a direction of rolling and unrolling of the display film through a slit of a main body of the mobile terminal; and a plurality of electromagnets formed in the display unit edges at predetermined intervals, for straightening the display unit edges by magnetic forces when the display film is unrolled to the outside of the main body.

The electromagnets are preferably disposed at opposite edges of the display film. The electromagnets are formed in a thin rectangular parallelepiped shape and the two opposite surfaces having the largest surface areas are disposed parallel to the front and rear surfaces. The electromagnets are preferably disposed in the same direction of magnetic polarity.

The flexible display unit may further include a stopper formed at a leading edge of the display film furthest from the main body.

A mobile terminal having a flexible display unit according to another exemplary embodiment of the present invention includes a main body formed with a slit and a flexible display unit being rolled or unrolled through the slit of the main body. The main body is formed in a cylindrical shape and has the slit formed at the circumferential surface of the main body in the lengthwise direction of a length greater than the width of the flexible display unit.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF PREFERRED EMBODIMENTS

Figure 1:
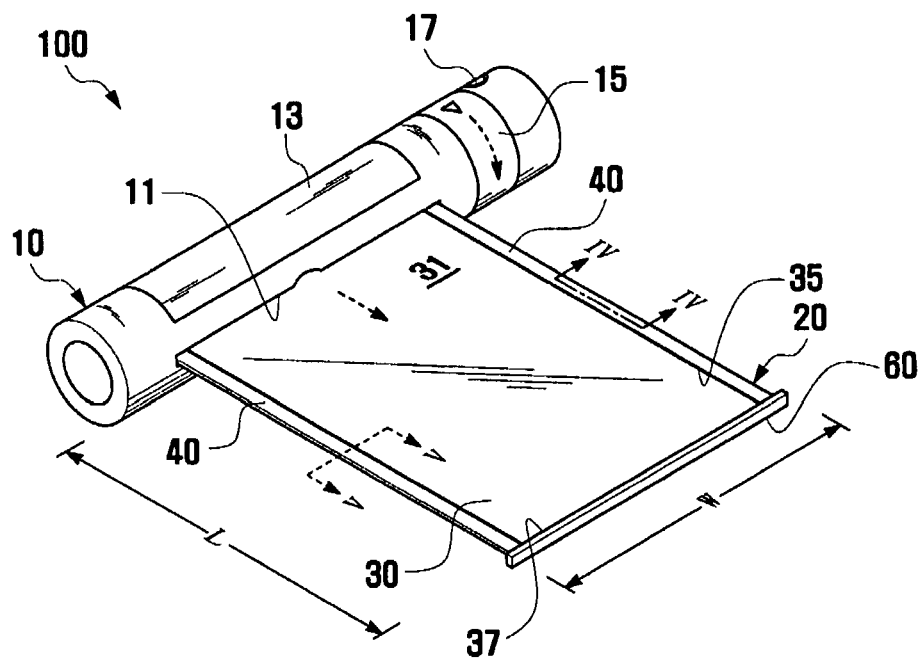
FIG. 1 is a perspective view of a mobile terminal having a flexible display unit according to the present invention, showing a state of the flexible display unit unrolled along the outside of a main body.

Preferred embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

Referring to FIGS. 1 to 5, the mobile terminal 100 includes the main body 10 formed with a slit 11, and the flexible display unit 20 being unrolled or rolled through the slit 11.

Preferably, the main body 10 is formed in a cylindrical shape. The slit 11 is formed along the circumferential surface of the main body 10 in the lengthwise direction of a length greater than the width W of the flexible display unit 20. The main body 10 includes a display screen 13 and an input key unit 15.

In operation, the display screen 13 outputs an operation state of the mobile terminal 100, such as sensitivity of radio reception, battery status, and current time.

Figure 2:
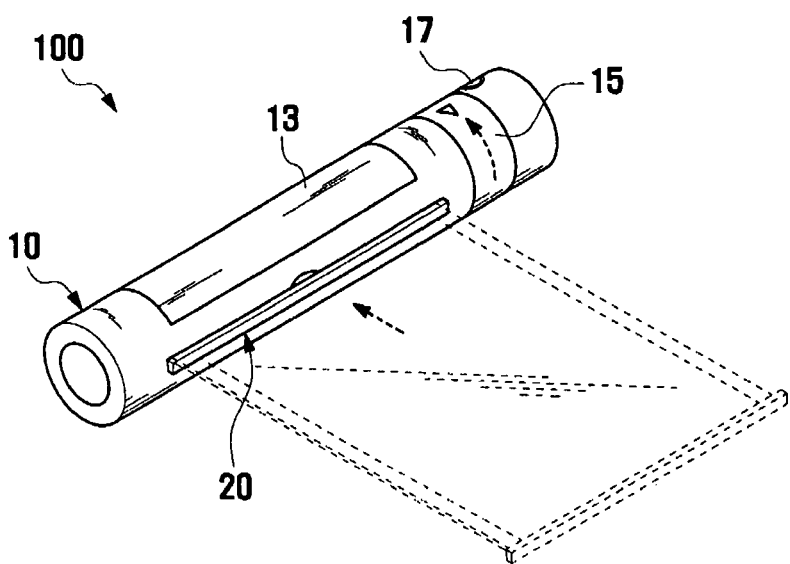
FIGS. 2 and 3 are perspective views of the mobile terminal of FIG. 1, showing a state of the flexible display unit rolled into the main body.
Figure 3:
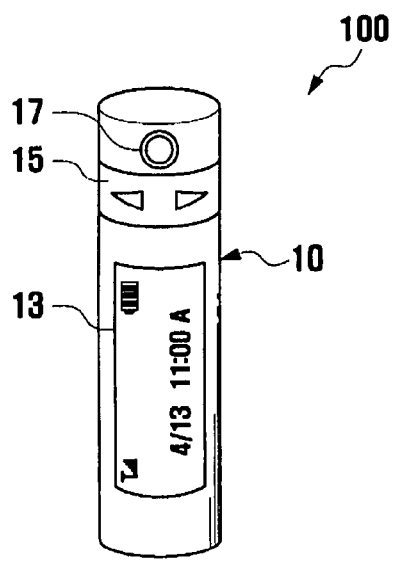

The input key unit 15 includes a plurality of keys to operate of the mobile terminal 100. The flexible display unit 20 may be rolled into the main body 10 or unrolled out from the main body 10 by operating the input key unit 15. The input key unit 15 may be in the form of a rotating wheel or press keys. A preferred embodiment of the present invention utilizes a rotating wheel. For example, if the input key unit 15 is rotated relative to the circumferential surface of the main body 10, to a certain degree in the clockwise direction, the flexible display unit 20 is rolled out from the main body 10 as shown in FIG. 1. If the input key unit 15 is rotated relative to the circumferential surface of the main body 10, to a certain degree in the counter-clockwise direction, the flexible display unit 20 is rolled into the main body 10 as shown in FIG. 2.

Although not shown in the drawings, a battery for supplying power to the mobile terminal 100 and a driving unit for rolling or unrolling the flexible display unit 20 through the slit 11 are installed in the main body 10. The main body 10 further includes a camera 17, and may include other devices such as a speaker and a microphone.

Although a main body 10 formed in a cylindrical shape is disclosed in the exemplary embodiment, the present invention is not limited thereto. For example, the main body 10 may be formed in various shapes such as a polygonal column and a disk, if the main body 10 has sufficient space for accommodating the flexible display unit 20.

The flexible display unit 20 includes a display film 30, display unit edges 40, electromagnets 50, and a stopper 60.

The display film 30 has a front surface 31 for displaying an image and a rear surface 33 opposite the front surface 31, and is flexible for rolling into the main body 10 easily. The display film 30 unrolled out from the main body 10 becomes a wide screen in a rectangular shape, wherein the length L of the display film 30 is greater than its width W. Alternatively, the display film 30 may be formed such that its length L is less than or equal to its width W. The display film 30 may be formed with a display panel using a liquid crystal display (LCD), organic light emitting diodes (OLED), and plastic material.

The display film 30 has display film edges 35 at opposite edges of the display film 30 in the direction of rolling and unrolling the display film 30 through the slit 11 of the main body 10. The display unit edges 40 is made of an insulated flexible material, and are formed along the display film edges 35.

A plurality of electromagnets 50 are installed in the display unit edges 40 at predetermined intervals, and magnetized by electric power if the display film 30 is unrolled out from the main body 10. When the display film 30 is rolled into the main body 10 through the slit 11, the electric power supplied to the electromagnet 50 is turned off and thereby the electromagnets 50 lose their magnetic properties.

The stopper 60 is formed at a leading edge 37 of the display film 30 furthest from the main body 10. The stopper 60 prevents the display film 30 from being completely rolled into the main body 10 and sustains straightness of the leading edge 37 of the display film 30. The stopper 60 may also be used as a handle for extending the display film 30 from the main body 10.

Figure 4:
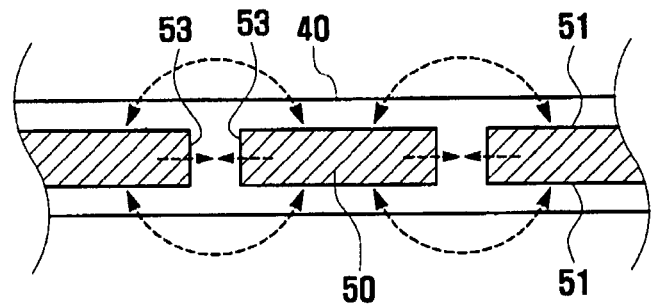
FIG. 4 is a cross-sectional view taken along the line IV-IV of FIG. 1.
Figure 5:
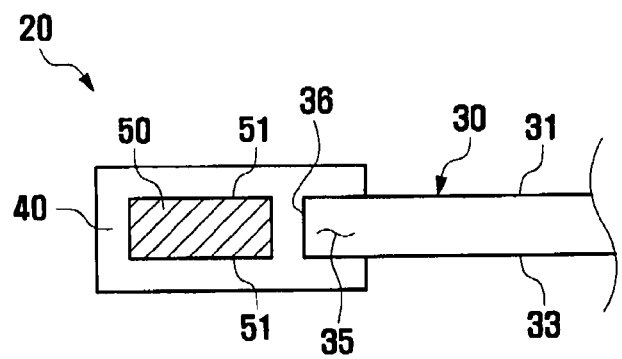
FIG. 5 is a cross-sectional view taken along the line V-V of FIG. 1.

As shown in FIGS. 4 and 5, the electromagnets 50 are formed in a thin rectangular parallelepiped shape, and installed such that the two opposite wide surfaces 51 having the largest surface areas are parallel to the front surface 31 and the rear surface 33 of the display film 30. The electromagnets 50 are disposed in the same direction of magnetic polarity. As electric power is supplied to the electromagnets 50 when the display film is unrolled out from the main body 10, an attractive force is applied between end surfaces 53 of adjacent pairs of electromagnets 50 and a repulsive force is applied between the wide surfaces 51 of adjacent pair of electromagnets 50 facing to the front surface 31 of the display film 30, and between the wide surfaces 51 of adjacent pairs of the electromagnets 50 facing to the rear surface 33 of the display film 30. Accordingly, the flexible display unit edges 40 become stiff, and the flexible display unit 20 unrolled out from the main body 10 becomes flat. If the electric power supplied to the electromagnets 50 is turned off, the display unit edges 40 that were stiffened by the magnetic property of the electromagnets 50 recover their flexibility. Accordingly, the flexible display unit 20 may be rolled into the main body 10 smoothly.

The electromagnets 50 are preferably formed in a size such that the flexible display unit 20 is smoothly rolled into the main body 10. The electromagnets 50 may also be formed all of the same size or of different lengths in the direction of rolling and unrolling the flexible display unit 20 gradually increasing from the innermost part to the outermost part of the flexible display unit 20. In the case of identical size of electromagnets 50, the electromagnets 50 are formed to a size such that the display unit edges 40 of the flexible display unit 20 may easily be rolled onto the minimum circumference of a roll of the flexible display unit 20 when wound in the main body 10. In the case of different sizes of electromagnets 50, the electromagnets 50 have different sizes such that the edges 40 of the flexible display unit 20 may easily be rolled corresponding to the roll diameter of the flexible display unit 20 when wound in the main body 10. Likewise, because the roll diameter of the flexible display unit 20 when rolled in the main body 10 increases from the innermost rolled portion to the outermost rolled portion, the length of electromagnet 50 is closer to the outmost part of the flexible display unit 20 becomes greater than that of an electromagnet 50 that is further inward.

In order to restrain the display film 30 from being influenced by the electromagnets 50, the electromagnets 50 are preferably installed in the display unit edges 40 at a predetermined distance from the display film edges 35. That is, the electromagnets 50 are installed in the display unit edges 40 so as to maintain a predetermined distance from a display film edge surface 36.

Hereinafter, a method of rolling the flexible display unit 20 into the main body 10 and drawing out the flexible display unit 20 from the main body 10 is described.

As shown in FIG. 2, the flexible display unit 20 is initially in a rolled-in state in the main body 10. As shown in FIG. 1, if the input key unit 15 is rotated to a certain degree in the clockwise direction, the flexible display unit 20 is unrolled to the outside of the main body 10 through the slit 11. If the flexible display unit 20 is unrolled to the outside of the main body 10, the electromagnets 50 are magnetized by electric power, and thereby an attractive force is applied to the end surfaces 53 of the electromagnets 50 adjacent to each other and a repulsive force is applied to the wide surfaces 51 of the electromagnets 50 facing to the front surface 31 and rear surface 33 of the display film 30. Accordingly, the flexible display unit edges 40 becomes stiff, and the flexible display unit 20 unrolled along the outside of the main body 10 becomes flat.

As shown in FIG. 2, if the input key unit 15 is rotated to a certain degree in the counter-clockwise direction, the flexible display unit 20 unrolled to the outside of the main body 10 is rolled back into the main body 10. For example, That is, if the input key unit 15 is rotated to a certain degree in the counter-clockwise direction, the electric power supplied to the electromagnets 50 is turned off, and the electromagnets 50 lose their magnetic properties. Consequently, the display unit edges 40 recover their initial flexibility, and, thereafter, the flexible display unit 20 is rolled into the main body 10 through the slit 11.

According to the present invention, display unit edges 40 including electromagnets 50 are installed at two opposite edges of a flexible display unit 20 at predetermined intervals. If the flexible display unit 20 is unrolled to the outside of a main body 10, electric power is supplied to the electromagnets 50. If the flexible display unit 20 is rolled into the main body 10, the electric power supplied to the electromagnets 50 is turned off.

When rolling into the main body 10, the flexible display unit 20 is smoothly rolled into the main body 10 in the same manner as in a conventional flexible display unit, because the electromagnets 50 recover their initial flexibility by turning off the electric power. When unrolled from the main body 10, the flexible display unit 20 unrolled to the outside of the main body 20 may maintain a straightened state by stiffening the display unit edges 40 with a magnetic force. Accordingly, when the flexible display unit 20 is unrolled along the outside of the main body 10, the problem associated with the flexible display unit 20 being rolled back or distorted is solved.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A flexible display unit of a mobile terminal, the flexible display unit being rolled or unrolled through a slit of a main body of the mobile terminal, comprising:
   a flexible display film having a front surface for displaying an image and a rear surface opposite to the front surface;
   insulated flexible display unit edges formed at opposite edges of the display film in the direction of rolling and unrolling the display film being through the slit of the main body; and
   a plurality of electromagnets formed in the display unit edges at predetermined intervals, for straightening the display unit edges by magnetic forces when the display film is unrolled to the outside of the main body.

2. The flexible display unit of claim 1, wherein the electromagnets are disposed at maintaining a predetermined distance from the edges of the display film.

3. The flexible display unit of claim 1, wherein the electromagnets are formed in a thin rectangular parallelepiped shape, and opposite surfaces having the largest surface areas are disposed parallel to the front and rear surfaces.

4. The flexible display unit of claim 3, wherein the electromagnets are disposed in the same direction of magnetic polarity.

5. The flexible display unit of claim 1, further comprising a stopper formed at a leading edge of the display film furthest from the main body.

6. A mobile terminal having a flexible display unit, the mobile terminal comprising:
   a main body formed with a slit; and
   a flexible display unit being rolled or unrolled through the slit of the main body;
   wherein the flexible display unit comprises a flexible display film having a front surface for displaying an image and a rear surface opposite to the front surface, insulated flexible display unit edges formed at opposite edges of the display film in the direction of rolling and unrolling the display film through the slit of the main body, and a plurality of electromagnets formed in the display unit edges at predetermined intervals for straightening the display unit edges by magnetic forces when the display film is unrolled to the outside of the main body.

7. The mobile terminal of claim 6, wherein the main body is formed in a cylindrical shape and the slit is formed at the circumferential surface of the main body in the lengthwise direction of a length greater than the width of the flexible display unit.

8. The mobile terminal of claim 6, wherein the electromagnets are disposed at opposite edges at predetermined intervals.

9. The mobile terminal of claim 6, wherein the electromagnets are formed in a thin rectangular parallelepiped shape, and two opposite surfaces having the largest surface areas are disposed parallel to the front and rear surfaces.

10. The mobile terminal of claim 9, wherein the electromagnets are disposed in the same direction of magnetic polarity.

11. The mobile terminal of claim 6, wherein the flexible display unit further comprises a stopper formed at a leading edge of the display film furthest from the main body.

* * * * *